April 21, 1925.

V. DE BELLIS 1,534,056

SPINDLE AND WHEEL CONSTRUCTION

Filed Aug. 13, 1924

Inventor
Vincent De Bellis,

By

Attorney

Patented Apr. 21, 1925.

1,534,056

UNITED STATES PATENT OFFICE.

VINCENT DE BELLIS, OF NEW YORK, N. Y.

SPINDLE AND WHEEL CONSTRUCTION.

Application filed August 13, 1924. Serial No. 731,850.

*To all whom it may concern:*

Be it known that I, VINCENT DE BELLIS, a citizen of the United States, residing at New York, in the county of New York and State of New York, have invented certain new and useful Improvements in Spindle and Wheel Constructions, of which the following is a specification.

My invention relates to improvements in spindle and wheel constructions, for vehicles, such as automobiles or the like.

An important object of the invention is to provide means for holding the wheel upon the spindle, in a manner to premit of its free rotation, but in the event that the wheel should tend to escape from the spindle, to lock the same against rotation upon the spindle, thereby bringing the vehicle to a stop.

Further object of the invention is to provide means of the above mentioned character, which are simple in construction, strong and durable.

Other objects and advantages of the invention will be apparent during the course of the following description.

Figure 1:
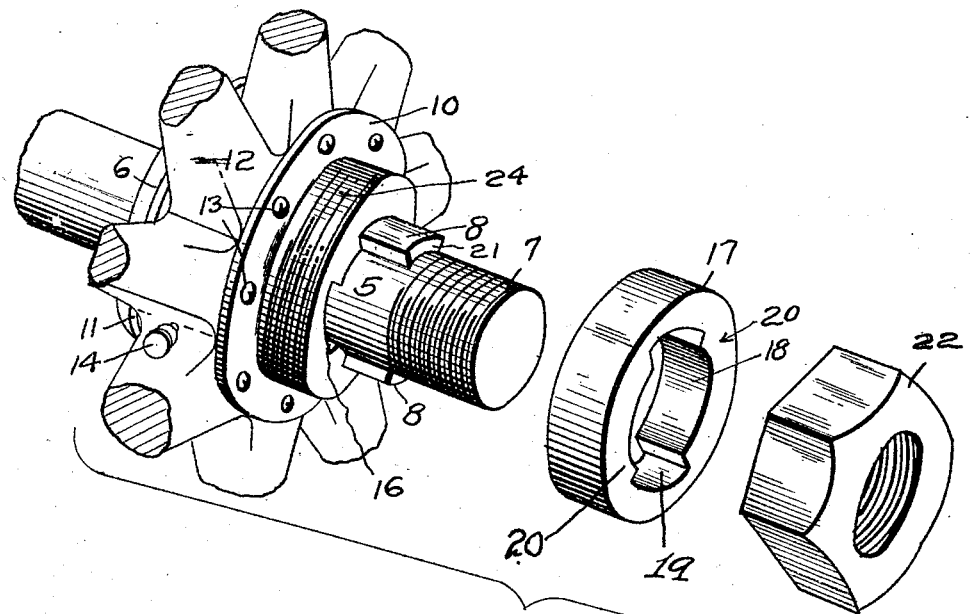
Figures 2, 3:
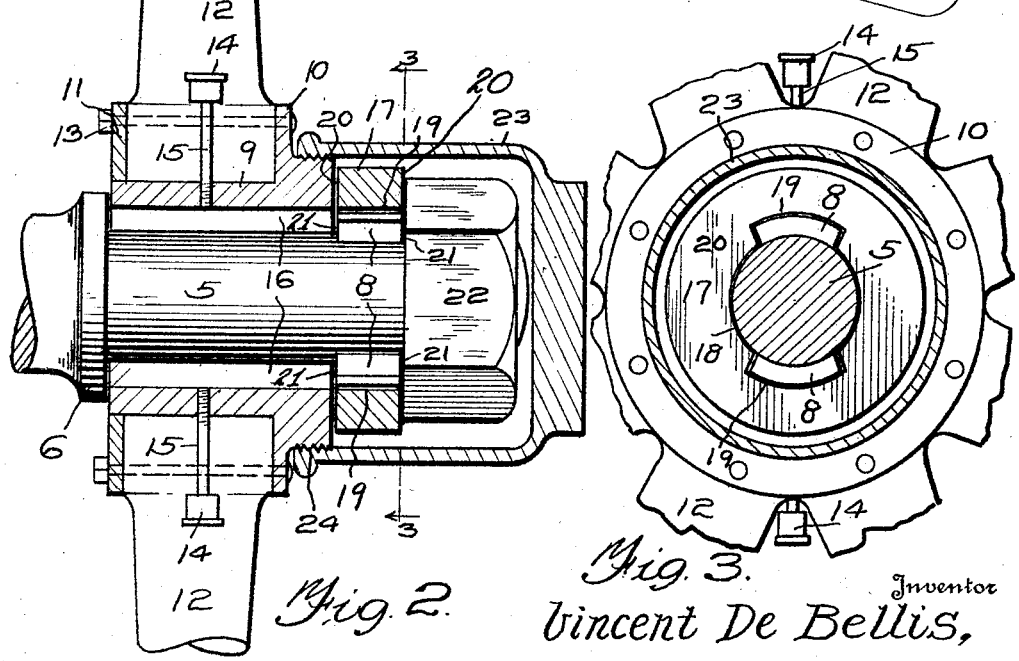

In the accompanying drawings forming a part of this application and in which like numerals are employed to designate like parts throughout the same, Figure 1 is a perspective view of the spindle and wheel construction, embodying my invention, parts being separated, Figure 2 is a central vertical longitudinal section through the same, and, Figure 3 is a transverse section taken on line 3—3 of Figure 2.

In the drawings, wherein for the purpose of illustration is shown a preferred embodiment of my invention, the numeral 5 designates a spindle, such as the front spindle of an automobile. This spindle may be equipped with inner flange 6, while its outer end is screw threaded, as shown at 7. Preferably formed integral with the spindle 5, inwardly of and adjacent to its screw threaded portion 7, are segmental lugs 8.

The numeral 9 designates the hub of a wheel, having a front annular flange 10 integral therewith. The numeral 11 designates a rear annular flange or ring, preferably separate from the tubular hub 9. The spokes 12 have their inner ends positioned between the flanges 10 and 11, and are clamped therein by bolts 13, as shown. Arranged between certain of the spokes 12, are grease cups 14, supplying the grease to the interior of the hub, through tubes 15. The tubular hub 9 is provided upon its inner wall will longitudinal segmental grooves 16, adapted to slidably receive the segmental lugs 8. As clearly shown in Figure 2, the lugs 8 are spaced a sufficient distance from the flange 6. whereby the tubular hub 9 may be positioned upon the spindle 5, between the flange 6 and lugs 8, and be free to rotate.

The numeral 17 designates a spacing washer, having a central opening 18, to receive the spindle 5, and segmental recesses 19, leading therein, which receive the lugs 8. The spacing washer has a thickness substantially equal to the width of the lugs 8, whereby the opposite faces 20 of the spacing washer are flush with the opposite faces 21 of the lugs 8, when applied thereto, as clearly illustrated in Figure 2. A nut 22 is screwed upon the screw threaded portion 7 of the spindle, and engages with the outer faces of the lugs and the spacing washer 17.

Surrounding the nut 22 and associated elements is a dust cap 23, having screw threaded engagement with the hub 9, at 24.

In view of the foregoing description, it will be seen that when the nut 22 remains completely screwed up upon the spindle, that the wheel is free to turn upon the spindle. Should the nut 22 become partly or wholly unscrewed, and the wheel should tend to move outwardly upon the spindle, its hub would shift the spacing washer 17 outwardly, and the lugs 8 would enter the grooves or recesses 16, thus automatically locking the wheel against rotation, upon the spindle.

It is to be understood that the form of my invention herewith shown and described is to be taken as a preferred embodiment of the same, and that various changes in the size, shape, and arrangement of parts, may be resorted to, without departing from the spirit of my invention or the scope of the subjoined claims.

Having thus described my invention, I claim:

1. A spindle having a rear flange and its forward end screw threaded, a radial lug rigidly attached to the spindle adjacent to its screw threaded end and spaced from the flange, a wheel including a tubular hub rotatable upon the spindle between the flange and lug and provided with a longitudinal groove to receive the lug when said hub is shifted outwardly upon the spindle, a nut mounted upon the screw threaded end of the spindle outwardly of the lug, and a spacing washer mounted upon the spindle and having a recess to receive the lug, said spacing washer having a thickness substantially corresponding to the width of the lug.

2. A spindle having an inner stop element and its outer end screw threaded, a radial lug rigidly attached to the spindle near its outer end and spaced from the stop element, a wheel including a tubular hub rotatable upon the spindle between the stop element and lug and having a longitudinal groove adapted to receive the lug when said hub is shifted outwardly upon the spindle, a nut carried by the screw threaded end of the spindle outwardly of the lug, and a spacing washer mounted upon the spindle and having a recess adapted to receive the lug, said spacing washer being sufficiently thick whereby it will hold the hub against outward movement sufficiently to cause the longitudinal groove to receive the lug, when the nut is in the inner position.

3. A spindle having an inner stop element and its outer end screw threaded, a radial lug carried by the spindle near its outer end and spaced from the stop element, a wheel including a tubular hub rotatable upon the spindle between the stop element and lug and having a longitudinal groove adapted to receive the lug when said hub is shifted outwardly upon the spindle, a nut carried by the screw threaded end of the spindle outwardly of the lug, and a spacing washer mounted upon the spindle and having a recess adapted to receive the lug, said spacing washer having a thickness at least as great as the length of said lug.

4. The combination with a spindle, of a hub rotatable thereon, means for holding the hub in the normal inner position so that it is free to rotate, and means to lock the hub to the spindle against rotation when the hub moves outwardly upon the spindle beyond the normal rotating position.

In testimony whereof I affix my signature.

VINCENT DE BELLIS.